Patented Mar. 22, 1949

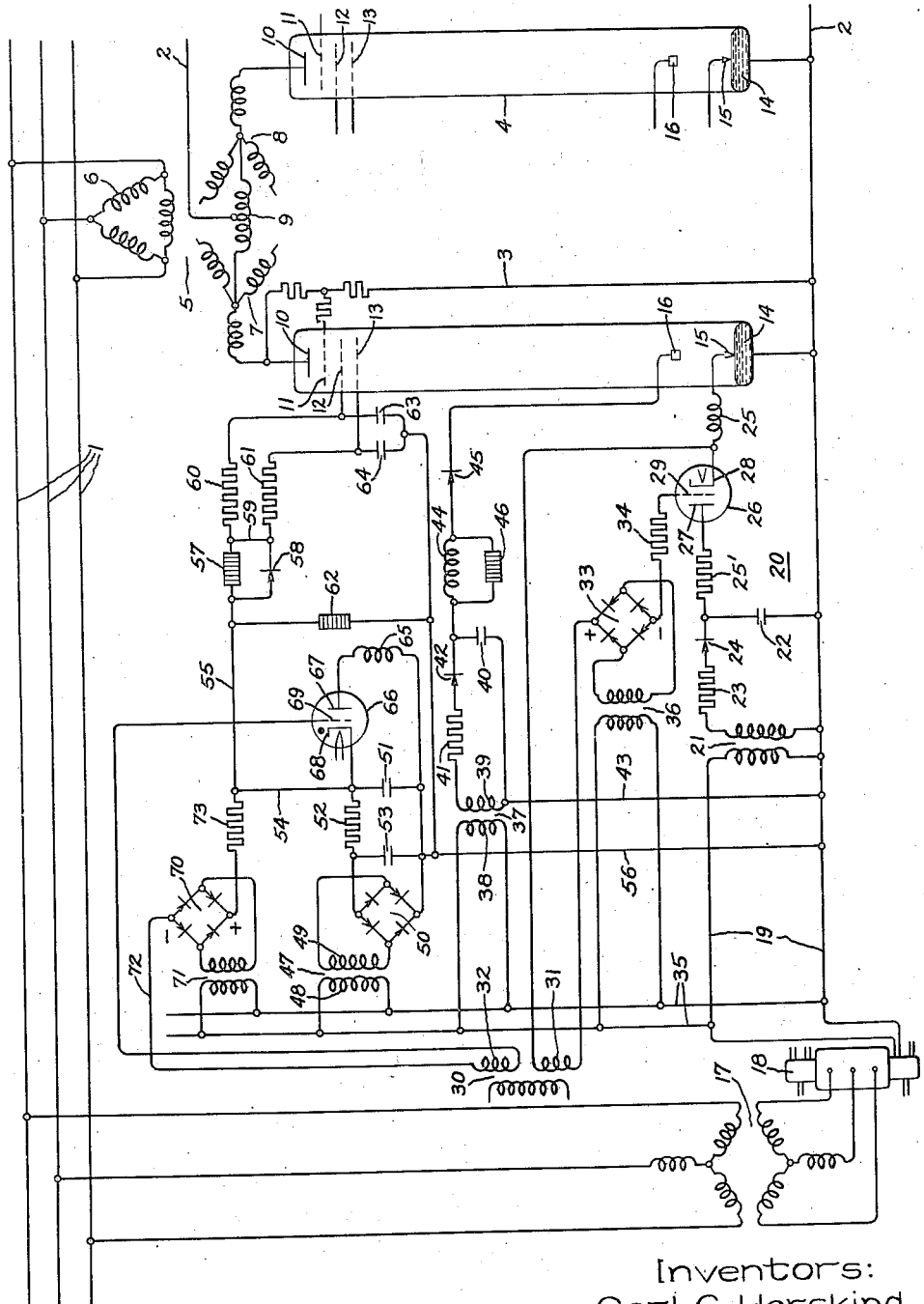

2,465,097

UNITED STATES PATENT OFFICE 2,465,097

ELECTRICAL VALVE EXCITATION CIRCUIT

Carl C. Herskind, Niskayuna, and Robert W. Kuenning, Schenectady, N. Y., assignors to General Electric Company, a corporation of New York Application April 1, 1948, Serial No. 18,324

7 Claims. (Cl. 315—269)

Our invention relates to electric valve excitation circuits, and more particularly to control or excitation circuits for electrical valves of the ignitron type having a grid, or grids, or analogous control electrodes to effect accurate starting and rapid deionization.

Grids or analogous electrodes have been used in ignitrons heretofore to obtain accurate starting and rapid deionization, particularly in electric valve inverter circuits, and various grid excitation circuits have been proposed or used. Heretofore, such grid excitation circuits have been complicated and required an inordinate amount of apparatus to obtain the desired degree of accuracy of control.

It is an object of our invention to provide new and improved excitation and control circuits for grid controlled electric valve apparatus.

It is another object of our invention to provide new and improved excitation and control circuits for gas-discharge valves of the immersion ignitor type.

In accordance with the illustrated embodiment of our invention the usual excitation or holding anode of an ignitron type of valve is energized by a half wave oscillatory discharge as soon as the ignitor fires, and the grid circuits are energized from an oscillatory circuit which serves both as a source of grid bias voltage and upon controlled initiation of oscillation in the oscillatory circuit as a source of grid firing voltage.

Our invention will be better understood from the following description taken in connection with the accompanying drawing, and its scope will be pointed out in the appended claims.

The single figure of the accompanying drawing is a diagrammatic representation of one embodiment of our invention as used in an electronic converting system.

Referring now to the drawing, we have shown our invention applied to an electric valve converting system, although our invention has also been found to be particularly suitable for use with ignitrons in a so-called ignitron contactor utilized as a switching device between a supply circuit and a load circuit. The electric valve converting system, which may be a rectifier or inverter, is very schematically represented as comprising an alternating current circuit 1 and a direct current circuit 2 interconnected in a conventional manner by a plurality of electric valve means 3 and 4 and a suitable converter transformer 5. The transformer 5 and the number of valves used may be connected in a number of suitable arrangements known in the art, depending upon the particular service desired. By way of illustration, we have shown a simple transformer arrangement having a three phase primary winding 6 and two groups of Y-connected secondary windings 7 and 8 interconnected by an interphase winding 9 to operate as a three phase or double-Y system. With the arrangement shown, six valves connected to the respective terminals of the windings 7 and 8 would be required for operation of the power system, but for purposes of simplicity only the two valves 3 and 4 have been shown connected to transformer terminals displaced in phase 180 degrees of the Y-sections 7 and 8 respectively.

Although our invention in its broader aspects is applicable to various types of grid controlled valves, we have shown it applied to an ignitron type of valve provided with a plurality of grids. For details of the type of valve illustrated, reference may be had to U. S. Patent No. 2,209,819 granted July 30, 1940, upon an application of K. H. Kingdon. For the purpose of explaining our invention as utilized in a converter system, it will suffice to refer to one of the valves 3 for application of the excitation and control circuits of our invention thereto, and this may be taken as applying to all the valves of the group since each valve in a complete system will be furnished with an identical excitation and control circuit.

Each valve comprises the usual enclosing envelope having therein an anode 10, a first electrode or grid 11 which acts as an intermediate anode, a control electrode or grid 12 which determines the time of starting and reduces the deionization period at the end of conduction, and an outer control electrode or grid 13 which acts in a dual capacity to pick up the arc at the beginning of conduction and to shield the other grids and anode structure from residual ionization after conduction. In addition, each of the valves 3 and 4 is provided with a mercury pool cathode 14 and an ignitor 15. Above the surface of the mercury is arranged a holding anode 16 which functions primarily to maintain the cathode spot after the spot has been initiated by the ignitor 15.

The power supply for both the ignitor circuits and the grid circuits may conveniently be obtained, as illustrated, from a suitable auxiliary transformer 17 energized from the alternating current circuit 1. In order to control the phase relation between the anode voltages and the control electrode voltage, a suitable phase shifting means 18 may be interposed between transformer 17 and the respective excitation circuits. The phase shifting means 18 is illustrated as being of a conventional rotary transformer type provided with a rotatable polyphase secondary member having an output circuit of appropriate phase for each of the six valves of the power conversion unit. The excitation power source for valve 3 is indicated by the conductors 19.

The specific form of the ignitor firing circuit 20 forms no part of our invention and any suitable type may be selected for the purpose of obtaining a complete excitation and control circuit in accordance with our invention. A satisfactory type of ignitor firing circuit may be of the tubeless or so-called magnetic type as disclosed and claimed in U. S. Patent No. 2,362,294, granted November 7, 1944, upon an application of A. H. Mittag or of the tube control type, as illustrated, and as described and claimed in U. S. Patent No. 2,110,700, granted March 8, 1938, upon an application of F. R. Elder. In the ignitor firing circuit 20 comprises an ignitor excitation transformer 21 energized from the conductors 19 connected to charge a capacitor 22 through a series connected impedance 23 and a unidirectional conducting device 24. The capacitor 22 is connected to supply a transient electrical impulse to the ignitor 15 through an inductive device 25, a resistor 25', and a controlled electric valve 26. The inductive device 25 may be referred to as the ignitor firing reactor and gives a sinusoidal waveform of the proper duration and peak current for firing the ignitor. The electric valve 26 is provided with an anode 27, a cathode 28 and a grid 29, with the anode-cathode circuit 27—28 connected in series relation with inductive device 25 to the ignitor 15 from one side of capacitor 22 and thence through the mercury pool 14 back to the other side of capacitor 22. Any suitable excitation circuit may be used to control the time and phase of the potential impressed upon the control electrode 29 of the valve 26 relative to the potential impressed between the anode 27 and cathode 28. In this case we have shown a separate signal transformer 30 which may be arranged to fire the main tube 3 synchronously with the voltage of supply circuit 1 or non-synchronously as desired. In one application previously referred to as an ignitron contactor, we have arranged to fire the main tube non-synchronously with the voltage of supply circuit 1 and at a maximum rate of 6 times per second. The signal transformer 30 is provided with two secondary windings 31 and 32. The purpose of winding 32 will be described later in connection with the grid excitation of the main valves. One terminal of winding 31 is connected to the cathode 28 of valve 26, and the other terminal is connected through a grid bias potential means 33 and a resistor 34 to the grid 29 of valve 26. The grid bias potential means may conveniently be a bi-phase double-way connection of contact rectifiers connected to an excitation bus 35 through a transformer 36.

The excitation circuit for the holding anode 16 is arranged to supply a half wave oscillatory discharge to maintain the arc as soon as the ignitor fires since the ignitor maintains the cathode spot for only about 450 microseconds. This circuit includes a transformer 37 having a primary winding 38 connected to be energized from the excitation bus 35, and a secondary winding 39 which is connected to charge a capacitor 40 through an impedance 41 and a unidirectional conducting device 42. One side of capacitor 40 is connected through a conductor 43 to the conductor of bus 19 which is connected to the cathode of the main valves. The other side of capacitor 40 is connected through an inductive device 44 and a unidirectional conducting device 45 to the holding anode 16. The function of the rectifier 45 is to prevent the excitation anode 16 from going negative while ionization is present in the ignitron. A resistor 46 is connected in parallel relation with inductive device 44 to afford protection thereof in the event of arc snap-out. The resistor 46 preferably should have a nonlinear volt-ampere characteristic, such as the resistance material having the trade-mark "Thyrite" which is disclosed and claimed in United States Patent No. 1,822,742 granted September 3, 1931, upon an application of Karl B. McEachron.

The excitation circuit for the control grid 12 and the outer or shield grid 13 is obtained from an oscillatory circuit which provides both a grid bias and a firing voltage. The grid of the ignitron must be maintained negative during the time that conduction is not desired. This circuit includes a transformer 47 having a primary winding 48 connected to be energized from the excitation bus 35 and a secondary winding 49 connected to the input terminals of a suitable rectifier 50 which, as illustrated, may be a bi-phase double-way rectifier connection of contact rectifier elements. The output terminals of rectifier 50 are connected to charge a capacitor 51 through a series connected impedance 52. A capacitor 53 may also be connected directly across the output terminals between the output terminals and the series connected impedance 52 and capacitor 51 in order to maintain a steady D.-C. voltage with a small ripple. One terminal of capacitor 51 is connected by means of conductor 54 to the circuit 55 leading to grids 12 and 13, while the other side of capacitor 51 is connected through a conductor 56 to the cathode circuit of the main valves. It will be noted that rectifier 50 is so poled that when capacitor 51 is charged it constitutes a negative bias in the circuit of grids 12 and 13 to cathode 14 of the main valve 3. The circuit 55 includes a resistor 57, preferably of the nonlinear type specified for resistor 46, shunted by a unidirectional conducting device which is poled in a direction to cause a lower impedance for current flow toward the grid 13 than in the reverse direction. The grid 12 is connected to the common junction 59 of elements 57 and 58 through a resistor 60, and grid 13 is connected to the same junction 59 through a resistor 61 of higher impedance than resistor 60 in order to insure that control grid 12 will fire after shield grid 13. A resistor 62 of the nonlinear type, as specified for resistor 46, is connected from the circuit 55 to the cathode of valve 3 to protect the circuit from overvoltage if an arc strikes on the grids. The grids 12 and 13 are preferably connected to the cathode of valve 3 through capacitors 63 and 64, respectively, in order to make the grid potential follow the absolute cathode potential during sudden changes in its potential.

When it is desired to start conduction, the grids must be made positive. The positive firing potential for the grids is obtained from the previously described bias capacitor 51 by providing therefor a controlled oscillating circuit which comprises an inductive element 65 connected across capacitor 51 through a controlled switching means such as the valve 66. The valve 66 is provided with an anode 67 connected to one terminal of inductive element 65, a cathode 68 connected to one side of capacitor 51 and a grid 69 interposed between its associated cathode and anode. The grid circuit of valve 66 includes a bias potential derived from a suitable rectifier 70 shown as a bi-phase double-way rectifier connected to be energized through a transformer 71 from the excitation bus 35. The direct current terminals of rectifier 70 are connected in series relation with a conductor 72, which in turn, is connected to one side of the secondary winding 32 of signal transformer 30. A resistor 73 is included in this series circuit to the cathode of valve 66. The other side of secondary winding 32 is connected to grid 69 of valve 66. With this arrangement, valve 66 may be rendered conductive when the signal voltage overcomes the negative bias voltage from rectifier 70 and raises grid 69 to a net positive potential relative to its cathode 68.

The general sequence of operation of the ignition and excitation circuits of the electric valve system is substantially as follows: The particular ignition circuit shown generates a positive peak of current at predetermined time intervals depending upon the signal voltage derived from winding 31 of signal transformer 30. It will be assumed that the anode 10 of the main valve 3 is positive relative to its cathode at a given time in the cyclic voltage charge of circuit 1. It will also be assumed that at this same instant capacitor 22 has become charged through resistor 23 and rectifier 24 so that its upper terminal, as viewed in the drawing, is positive and its lower terminal is negative. If at this time the potential from signal transformer winding 31 exceeds the negative bias potential produced at rectifier 33 and thereby raises the potential of grid 29 above the critical firing potential of valve 26, valve 26 will be rendered conductive so that capacitor 22 will discharge through inductive device 25, valve 26 and the ignitor 15. The wave-form of the potential impressed upon the ignitor 15 will be of relatively steep wave front and short duration and cause a cathode spot to be formed on the surface of mercury pool cathode 14. Ordinarily, with a gas type tube for the control tube 26, the discharge would tend to persist over a relatively long period but with the inductive device 25 connected in series with the anode-cathode circuit of tube 26 a negative voltage is impressed on the anode during the latter part of the discharge of capacitor 22 to render tube 26 non-conductive. Upon establishment of the cathode spot on mercury pool cathode 14, current in the circuit of holding anode 16 starts to flow by reason of the discharge of capacitor 40 and thereby maintains the cathode spot after the ignitor peak has subsided.

Prior to the establishment of the cathode spot on cathode 14, the potential on shield grid 13 and control grid 12 is maintained negative due to the negative bias voltage introduced into this grid circuit by capacitor 51. However, when the signal voltage from secondary winding 31 triggers tube 26 in the ignitor circuit or a predetermined time thereafter, the signal voltage from secondary winding 32 also triggers the control tube 66 connected in the discharge circuit of capacitor 51. Capacitor 51 discharges through tube 66 and inductive device 65 and in view of the fact that this circuit is designed for an oscillatory discharge, capacitor 51 is left charged in the opposite direction and thereby provides a voltage in a direction to impress upon grids 12 and 13 a positive potential. The time of oscillation of the oscillatory grid circuit provides sufficient time delay to keep grids 12 and 13 from going positive until the ignitor fires. However, in certain applications it may be desirable to introduce time delay means, such as a well-known capacitor-resistor combination in the grid circuit of tube 66 in order to assure establishment of the cathode spot before positive voltage is applied to control grid 12. With both grids 12 and 13 positive, conduction is established between anode 10 and its cathode 14. As tube 66 is rendered non-conductive upon the reversal of polarity of capacitor 51, capacitor 51 is again charged through rectifier 50 to reestablish a negative bias in grids 12 and 13 by the end of the conduction period of valve 3.

While we have shown and described a particular embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an electric discharge device having an anode, a cathode and a control grid positioned between the anode and cathode, means comprising a capacitor connected between said cathode and said control grid and serving selectively as a source of negative bias voltage and as a source of positive firing voltage, means for charging said capacitor with a polarity effective to bias said grid negative during the charging period of said capacitor with respect to said cathode, means comprising an oscillatory circuit connected for discharging said capacitor and reversing the charge thereon so that said capacitor during its discharging period renders said grid positive with respect to said cathode, and means for controlling the conductivity of said oscillatory circuit.

2. In combination, an electric discharge device having an anode, a cathode and a control grid positioned between the anode and cathode, means comprising a capacitor connected between said cathode and said control grid and constituting alternately a source of negative bias voltage and a source of positive firing voltage between said grid and cathode, means comprising a rectifier for charging said capacitor with a polarity effective to bias said grid negative during the negative period of said capacitor with respect to said cathode, a discharge circuit connected across said capacitor and comprising an inductive device and circuit controlling means connected in series relation in said discharge circuit for reversing the charge on said capacitor upon discharge and impressing from said capacitor a positive potential on said grid, and means connected to said circuit controlling means for selectively rendering said discharge circuit conductive.

3. In combination, an electric discharge device of the type employing an ionizable medium and comprising an anode, a cathode and a control electrode, means for initiating electron emission at said cathode, a circuit interconnecting said control electrode and said cathode, a capacitor connected in series relation with said control electrode, means for charging said capacitor with a polarity to bias said control electrode negative with respect to said cathode, an oscillatory discharge circuit connected to said capacitor and including an inductive device and circuit closing means, and means controlling said circuit closing means for discharging said capacitor through said inductive device so as to reverse the charge on said capacitor and render said control electrode positive with respect to said cathode.

4. In combination, an electric discharge device of the type employing an ionizable medium and comprising an anode, a cathode and a control electrode, means for initiating electron emission at said cathode, a control electrode excitation circuit including a capacitor, means for charging said capacitor with a polarity to bias said control electrode negative with respect to said cathode, a discharge circuit connected to said capacitor and including an inductive device and an electric valve in series relation in said discharge circuit, and signal controlling means connected to said first mentioned means and said electric valve means for establishing electron emission at said cathode and conductivity of said electric valve means in said discharge circuit.

5. In combination, an electric discharge device of the type employing an ionizable medium and comprising an anode, a cathode, a holding anode and a grid interposed between said anode and cathode, means including an electric valve for periodically establishing electron emission at said cathode, a half wave oscillatory discharge circuit including a capacitor and an inductive device connected in series relation with said holding anode to energize said holding anode upon establishment of electron emission at said cathode, a grid excitation circuit including a capacitor interconnected between said grid and said cathode, a charging circuit including a rectifier connected across said last-mentioned capacitor and poled to charge said capacitor with a potential to bias said grid negatively with respect to said cathode, a discharge circuit connected across said last-mentioned capacitor and including an inductive device and an electric valve connected in series relation, and signal controlling means connected to each of said electric valves for establishing conductivity thereof in a predetermined order.

6. In combination, an electric discharge device having an anode, a cathode and a grid interposed between the anode and cathode, an energizing circuit interconnecting said grid and said cathode, a capacitor interposed in series relation with said energizing circuit, rectifying means connected in a charging circuit with said capacitor and being poled so as to establish a potential across said capacitor in a direction to bias said grid negatively with respect to said cathode, a discharging circuit connected across said capacitor and including in series relation an inductive device and an electric valve provided with a control electrode, a source of negative bias voltage connected in circuit with said control electrode, and a second source of voltage connected in circuit with said control electrode for selectively establishing conductivity of said electric valve and thereby a closed current path in said discharging circuit.

7. In combination, an electric discharge device of the type employing an ionizable medium and comprising an anode, a mercury pool cathode, an immersion-ignitor control member associated with said cathode, a holding anode and a grid interposed between said anode and cathode, voltage supply means for transmitting impulses of energizing current to said immersion-ignitor control member to establish a cathode spot on said cathode, an energizing circuit interconnecting said holding anode and said cathode and including in series relation a capacitor, an inductive device and a unidirectional conducting device, rectifying means connected to charge said capacitor and being poled to establish a positive potential on said holding anode, the path of electron emission between said cathode and said holding anode constituting a discharge circuit for said capacitor upon initiation of said cathode spot, an excitation circuit including a second capacitor interconnected between said grid and said cathode, a charging circuit including a rectifier connected across said second capacitor and poled to charge said capacitor with a potential to bias said grid negatively with respect to said cathode, a discharging circuit connected across said second capacitor and comprising in series relation an inductive device and an electric valve provided with a control electrode to effect reversal of polarity of said second capacitor upon conduction of said electric valve, and transformer signal means connected to said voltage supply means and the control electrode of said electric valve means to effect establishment of a cathode spot at said cathode and conductivity of said electric valve.

CARL C. HERSKIND.
ROBERT W. KUENNING.

REFERENCES CITED

The following references are of record in the file of this patent:

UNITED STATES PATENTS

| Number | Name | Date |
| --- | --- | --- |
| 1,937,869 | Brown | Dec. 5, 1933 |
| 2,003,992 | Cockrell | June 4, 1935 |
| 2,088,495 | Swedlund | July 27, 1937 |
| 2,125,091 | Vedder | July 26, 1938 |
| 2,151,560 | Morack | Mar. 21, 1939 |

Certificate of Correction

Patent No. 2,465,097.  March 22, 1949.

CARL C. HERSKIND ET AL.

It is hereby certified that error appears in the printed specification of the above numbered patent requiring correction as follows:

Column 6, line 53, claim 2, for the word "negative" second occurrence, read *charging*;

and that the said Letters Patent should be read with this correction therein that the same may conform to the record of the case in the Patent Office.

Signed and sealed this 13th day of September, A. D. 1949.

[SEAL]

JOE E. DANIELS,
*Assistant Commissioner of Patents.*